US012636609B2

(12) United States Patent
Archetti et al.

(10) Patent No.: US 12,636,609 B2
(45) Date of Patent: May 26, 2026

(54) SCRUBBER FOR WASHING EXHAUST FUMES GENERATED BY INTERNAL COMBUSTION ENGINES

(71) Applicant: ECOSPRAY TECHNOLOGIES S.R.L., Voghera (IT)

(72) Inventors: Maurizio Archetti, Terre di Pedemonte (CH); Luca Muratori, Pontecurone (IT)

(73) Assignee: ECOSPRAY TECHNOLOGIES S.R.L., Voghera (IT)

( * ) Notice: Subject to any disclaimer, the term of this patent is extended or adjusted under 35 U.S.C. 154(b) by 363 days.

(21) Appl. No.: 18/043,512

(22) PCT Filed: Sep. 1, 2021

(86) PCT No.: PCT/IB2021/057970

§ 371 (c)(1),
(2) Date: Feb. 28, 2023

(87) PCT Pub. No.: WO2022/049492

PCT Pub. Date: Mar. 10, 2022

(65) Prior Publication Data

US 2023/0321592 A1      Oct. 12, 2023

(30) Foreign Application Priority Data

Sep. 2, 2020    (IT) ........................ 102020000020857

(51) Int. Cl.
*B01D 53/18*        (2006.01)
*B01D 47/06*        (2006.01)
(Continued)

(52) U.S. Cl.
CPC ......... *B01D 53/185* (2013.01); *B01D 47/063* (2013.01); *B01D 53/1481* (2013.01);
(Continued)

(58) Field of Classification Search
None
See application file for complete search history.

(56) References Cited

U.S. PATENT DOCUMENTS 4,539,024 A * 9/1985 Stehning .............. B01D 53/501
96/356
5,474,597 A * 12/1995 Halldin .................. B01D 53/74
95/200

FOREIGN PATENT DOCUMENTS

EP       2859935 A1    4/2015
EP       3187245 A1 *  7/2017  ............. B01D 53/78
(Continued)

OTHER PUBLICATIONS

KR101869380B1_ENG (Espacenet machine translation of Lee) (Year: 2018).*

(Continued)

*Primary Examiner* — Gabriel E Gitman
(74) *Attorney, Agent, or Firm* — Stetina Garred Brucker & Newboles

(57)        ABSTRACT

A scrubber for cleaning exhaust fumes generated by internal combustion engines, in particular for reducing the concentration of the sulfur oxides SOx in exhaust fumes generated by the combustion of high sulfur content fuels, said scrubber comprising a main hollow tubular body, an inlet and an outlet for introducing and discharging said fumes into and from said main hollow tubular body, respectively, and inlet means for introducing at least partially atomized pressurized water into said main hollow body, wherein said inlet means comprise a plurality of nozzles arranged in said main hollow body and each adapted to dispense said at least partially atomized pressurized water.

8 Claims, 2 Drawing Sheets

(51) Int. Cl.

| | | |
|---|---|---|
| *B01D 53/14* | (2006.01) | |
| *F01N 3/04* | (2006.01) | |
| *F23J 15/04* | (2006.01) | |
| *B01D 53/78* | (2006.01) | |
| *B01D 53/92* | (2006.01) | |

(52) U.S. Cl.
CPC ........... *B01D 53/1493* (2013.01); *F01N 3/04* (2013.01); *F23J 15/04* (2013.01); *B01D 53/78* (2013.01); *B01D 53/92* (2013.01); *B01D 2252/103* (2013.01); *B01D 2257/302* (2013.01); *B01D 2258/01* (2013.01); *B01D 2258/012* (2013.01); *F23J 2215/20* (2013.01)

(56) References Cited

FOREIGN PATENT DOCUMENTS

| | | | | | |
|---|---|---|---|---|---|
| EP | 3199224 | A1 | * | 8/2017 | ............ B01D 47/00 |
| EP | 3626326 | A1 | | 3/2020 | |

| | | | | | |
|---|---|---|---|---|---|
| JP | S5949823 | A | * | 3/1984 | |
| KR | 101869380 | B1 | * | 6/2018 | ........... B01D 47/063 |
| WO | WO-9533552 | A1 | * | 12/1995 | ............ B01D 47/06 |
| WO | WO-2020050477 | A1 | * | 3/2020 | .............. F01N 3/04 |

OTHER PUBLICATIONS

WO2020050477A1_ENG (Espacenet machine translation of Kim) (Year: 2020).*

JPS5949823A_ENG (Espacenet machine translation of Koufuku) (Year: 1984).*

WO2020050477A1_ENG (Espacenent machine translation of Kim) (Year: 2020).*

Patent Cooperation Treaty, International Search Report and Written Opinion for International Application No. PCT/IB2021/057970, Jan. 5, 2022, 14 pages.

* cited by examiner

SCRUBBER FOR WASHING EXHAUST FUMES GENERATED BY INTERNAL COMBUSTION ENGINES

CROSS-REFERENCE TO RELATED APPLICATIONS

This application claims priority to PCT International Application No. PCT/IB2021/057970 filed on Sep. 1, 2021, which applications claims priority to Italian Patent Application No. 102020000020857 filed on Sep. 2, 2020, the entire disclosures of which are expressly incorporated herein by reference.

STATEMENT RE: FEDERALLY SPONSORED RESEARCH/DEVELOPMENT

Not Applicable

BACKGROUND

Field of the Invention

The present invention belongs to the field of the treatment of exhaust fumes generated by internal combustion engines, marine engines in particular. In particular, the present invention belongs to the field of cleaning the exhaust fumes generated by internal combustion engines of the aforesaid type, in particular of the desulfurization (reduction of the concentration of the sulfur oxides SOx) of fumes or exhaust gases generated by internal combustion engines, internal combustion marine engines in particular.

Therefore, the object of the present invention is an innovative system (scrubber) for treating fumes or exhaust gases generated by internal combustion engines, by internal combustion marine engines in particular, in particular for the desulfurization (reduction of the sulfur oxides SOx) of fumes or exhaust gases generated by the combustion of high sulfur content fuels.

Background Art

The use of high sulfur content fuels for supplying internal combustion marine engines is widespread in the field of both commercial and pleasure navigation. Cleaning the fumes or exhaust gases generated by said internal combustion engines is also widespread in the field of both commercial and pleasure navigation.

Said cleaning aims to abate the SOx (sulfur oxide) emissions generated by the combustion of high sulfur content fuels and usually is performed by scrubbers capable of effectively reducing the concentration of the aforesaid pollutant below (or at least within) the limits envisaged by the most stringent legislation. Moreover, in certain geographical areas called ECAs (emission controlled area), said legislation imposes the limit of the chimney emissions—defined as $SO2/CO2$ ratio—to be less than 4.3, wherein generally an $SO2/CO2$ ratio less than 21.7 is in any case envisaged in the areas outside the ECAs. The scrubbers are generally installed on the discharge ducts of the diesel engines and the fumes therein are cleaned by means of seawater (called open-loop in the simplest version) introduced under pressure and at least partially atomized which, by virtue of its natural alkalinity, neutralizes the sulfur oxides in the fumes. In the systems of the known type, in particular also in those designed and installed by the Applicant, the water is moved by means of a centrifuge pump and is then injected into the scrubber by means of a given number of nozzles designed and produced by the Applicant, which number and/or arrangement depend on the size of the scrubber, which in turn depends on the size of the internal combustion engine to which the scrubber is connected and dedicated. The efficiency of the scrubber depends on several factors comprising, in particular:

the residence time (gas/water droplets contact time);
distribution and size of the droplets (which depends in turn on the spray pressure);
distribution of the gas in the tower (of the scrubber).

Although they may be appreciated from certain viewpoints such as reliability, manufacturing simplicity ad all in all contained implementation and operating costs, scrubbers of the known type are affected by various problems and/or drawbacks.

A first problem or drawback relates to the fact that an effective atomization of the water in the scrubber requires a decidedly high spray pressure, and therefore considerable consumption of electrical energy.

A second problem or drawback relates to the fact that scrubbers of the known type do not always ensure an abatement of the sulfur oxides in compliance with the current legislation; in particular, they do not ensure achieving an $SO2/CO2$ ratio of less than 4.3 in the ECA geographical areas.

Finally, a further drawback encountered in scrubbers of the known type relates to the fact that they do not ensure an adequately uniform distribution of the gases or fumes to be cleaned in the scrubber, wherein a uniform distribution of the gases or fumes is an essential prerequisite for effectively cleaning them.

Thus, the problem faced by the Applicant of the present Patent Application is to provide a scrubber which allows the drawbacks encountered in the scrubbers according to the prior art to be overcome or at least limited.

Thus, the main object of the present invention is to propose and provide a scrubber for effectively cleaning the fumes or exhaust gases generated by internal combustion engines, internal combustion marine engines in particular, which allows an $SO2/CO2$ ratio of less than 4.3 to be achieved.

It is a further object of the present invention to propose and provide a scrubber for effectively cleaning the fumes or exhaust gases generated by internal combustion engines, internal combustion marine engines in particular, which allows an effective atomization of the water in the scrubber at a contained spray pressure, or at least reduced with respect to the required spray pressure in scrubbers of the known type.

Finally, it is a further object of the present invention to provide a solution of the aforesaid type which may be achieved and implemented at contained costs and according to simple and easy execution methods, which may be implemented both on chimneys or stacks of various type and without requiring substantial structural modifications of said chimneys or stacks.

DESCRIPTION OF THE PRESENT INVENTION

The present invention is based on the general consideration, developed by the Applicant, according to which the problems or drawbacks encountered in the scrubbers according to the prior art may be effectively overcome or at least reduced by arranging the nozzles so that at least some of them are oriented towards one another, and therefore so as to spray the atomized water towards one another.

According to a further consideration developed by the Applicant, satisfactory results (with reference to the above objects) may be obtained by arranging the nozzles so that they are (preferably) coaxial, but in any case mutually arranged on average at a predefined distance "D" between 400 mm and 1000 mm (preferably not greater than 800 mm).

The Applicant has indeed verified that the arrangement of the nozzles in compliance with the above considerations allows a plurality of collisions to be generated between the drops exiting the nozzles, which give rise to a further splitting of the latter, therefore forming a thick fog of droplets adapted to effectively and evenly hit the gases or exhaust fumes to be treated.

Furthermore, the aforesaid arrangement and/or configuration of the nozzles allows the following advantages to be obtained with respect to the arrangement and/or configuration of the nozzles in the scrubbers of the known type:

Reduction of the spray pressure by up to 4 times—drop size being equal—with subsequent reduction of the absorbed electrical energy;

Reduction of the residence times of the scrubber, to the advantage of the compactness of the latter, by virtue of the increased density of very small droplets.

On the basis of the above considerations, as well as with the aim to overcome or at least reduce the problems or drawbacks encountered in the scrubbers according to the prior art, the object of the present invention is a scrubber for cleaning exhaust fumes generated by internal combustion engines, in particular for reducing the concentration of the sulfur oxides $SO_x$ in exhaust fumes generated by the combustion of high sulfur content fuels, said scrubber comprising a main hollow tubular body, an inlet and an outlet for introducing and discharging said fumes into and from said main hollow tubular body, respectively, and inlet means for introducing pressurized water into said main hollow body, wherein said inlet means comprise a plurality of nozzles arranged in said main hollow body and each adapted to dispense said at least partially atomized water, wherein said plurality of nozzles comprises a first sub-plurality of nozzles each adapted to dispense said at least partially atomized water in counter-flow (countercurrent) with respect to the flow of said fumes in said main hollow body from said inlet towards said outlet, and a second sub-plurality of nozzles each adapted to dispense said at least partially atomized water in counter-flow with respect to the flow of said at least partially atomized water dispensed by said first sub-plurality of nozzles.

According to an embodiment, the projection of at least one of said nozzles of said first sub-plurality onto a plane perpendicular to the longitudinal axis of said main hollow tubular body at least partially overlaps the projection onto the same plane of at least one nozzle of said second sub-plurality of nozzles.

According to an embodiment, said first sub-plurality and second sub-plurality of nozzles comprise the same number of nozzles.

According to an embodiment, said plurality of nozzles comprises a third sub-plurality of nozzles each adapted to dispense said at least partially atomized water in counter-flow with respect to the flow of said fumes in said main hollow body from said inlet towards said outlet, and a fourth sub-plurality of nozzles each adapted to dispense said at least partially atomized water in counter-flow with respect to the flow of said at least partially atomized water dispensed by said third sub-plurality of nozzles.

According to an embodiment, the projection of at least one of said nozzles of said third sub-plurality onto a plane perpendicular to the longitudinal axis of said main hollow tubular body at least partially overlaps the projection onto the same plane of at least one nozzle of said fourth sub-plurality of nozzles.

According to an embodiment, said third sub-plurality and fourth sub-plurality of nozzles comprise the same number of nozzles.

According to an embodiment, the nozzles of said first sub-plurality are arranged downstream of the nozzles of said second sub-plurality with respect to the flow of said fumes from said inlet towards said outlet.

According to an embodiment, each of the nozzles of said first sub-plurality and second sub-plurality comprises a dispensing orifice, wherein the dispensing orifices of the nozzles of said first sub-plurality lie on a first plane perpendicular to the longitudinal axis of said main hollow body, wherein the dispensing orifices of the nozzles of said second sub-plurality lie on a second plane parallel to said first plane, and wherein said first plane is arranged adjacent to said second plane at a first predefined distance from said second plane.

According to an embodiment, the nozzles of said third sub-plurality are arranged downstream of the nozzles of said fourth sub-plurality with respect to the flow of said fumes from said inlet towards said outlet.

According to an embodiment, each of the nozzles of said third sub-plurality and fourth sub-plurality comprises a dispensing orifice, wherein the dispensing orifices of the nozzles of said third sub-plurality lie on a third plane perpendicular to the longitudinal axis of said main hollow body, wherein the dispensing orifices of the nozzles of said fourth sub-plurality lie on a fourth sub-plurality parallel to said third plane, and wherein said third plane is arranged adjacent to said fourth plane at a second predefined distance from said fourth plane.

According to an embodiment, said plurality of nozzles comprises a fifth sub-plurality of nozzles each adapted to dispense said at least partially atomized water in counter-flow with respect to the flow of said fumes in said main hollow body from said inlet towards said outlet, wherein the nozzles of said fifth sub-plurality are arranged upstream of the nozzles of said second sub-plurality with respect to the flow of said fumes from said inlet towards said outlet.

According to an embodiment, said plurality of nozzles comprises a sixth sub-plurality of nozzles each adapted to dispense said at least partially atomized water in counter-flow with respect to the flow of said at least partially atomized water dispensed by said third sub-plurality of nozzles, wherein the nozzles of said sixth sub-plurality are arranged downstream of the nozzles of said third sub-plurality with respect to the flow of said fumes from said inlet towards said outlet.

According to an embodiment, said plurality of nozzles comprises a seventh sub-plurality of nozzles each adapted to dispense said at least partially atomized water in counter-flow with respect to the flow of said fumes in said main hollow body from said inlet towards said outlet, wherein the nozzles of said seventh sub-plurality are arranged downstream of the nozzles of said sixth sub-plurality with respect to the flow of said fumes from said inlet towards said outlet.

According to an embodiment, each of the nozzles of said plurality of nozzles is put into fluid communication with a main tubular manifold which extends in said main hollow tubular body parallel to the longitudinal axis of said main hollow tubular body and is adapted to allow the transit of said pressurized water and to feed each of said nozzles.

According to an embodiment, said scrubber comprises a plurality of main branches in fluid communication with said main tubular manifold, wherein each of said branches extends in said main hollow tubular body perpendicular to the direction of extension of said main tubular manifold, and wherein each of said branches is in fluid communication with at least one of said sub-pluralities of nozzles.

Possible further embodiments of the scrubber according to the present invention are defined by the claims.

DESCRIPTION OF THE DRAWINGS

Further features and advantages of the invention shall be more apparent from the following description of some preferred, but not exclusive, embodiments of the present invention, shown by way of non-limiting example, with the support of the accompanying drawings, in which.

DETAILED DESCRIPTION

The present invention revealed being particularly advantageous when used to treat exhaust gases generated by marine engines, this being the reason why the present invention is described later with particular possible reference to the application thereof to marine engines. However, the applications of the present invention are not limited to the treatment of exhaust gases of marine engines; on the contrary, the present invention finds equally advantageous application in the field of the treatment of gases of any origin, in particular contaminated by sulfur oxides.

Figure 1:
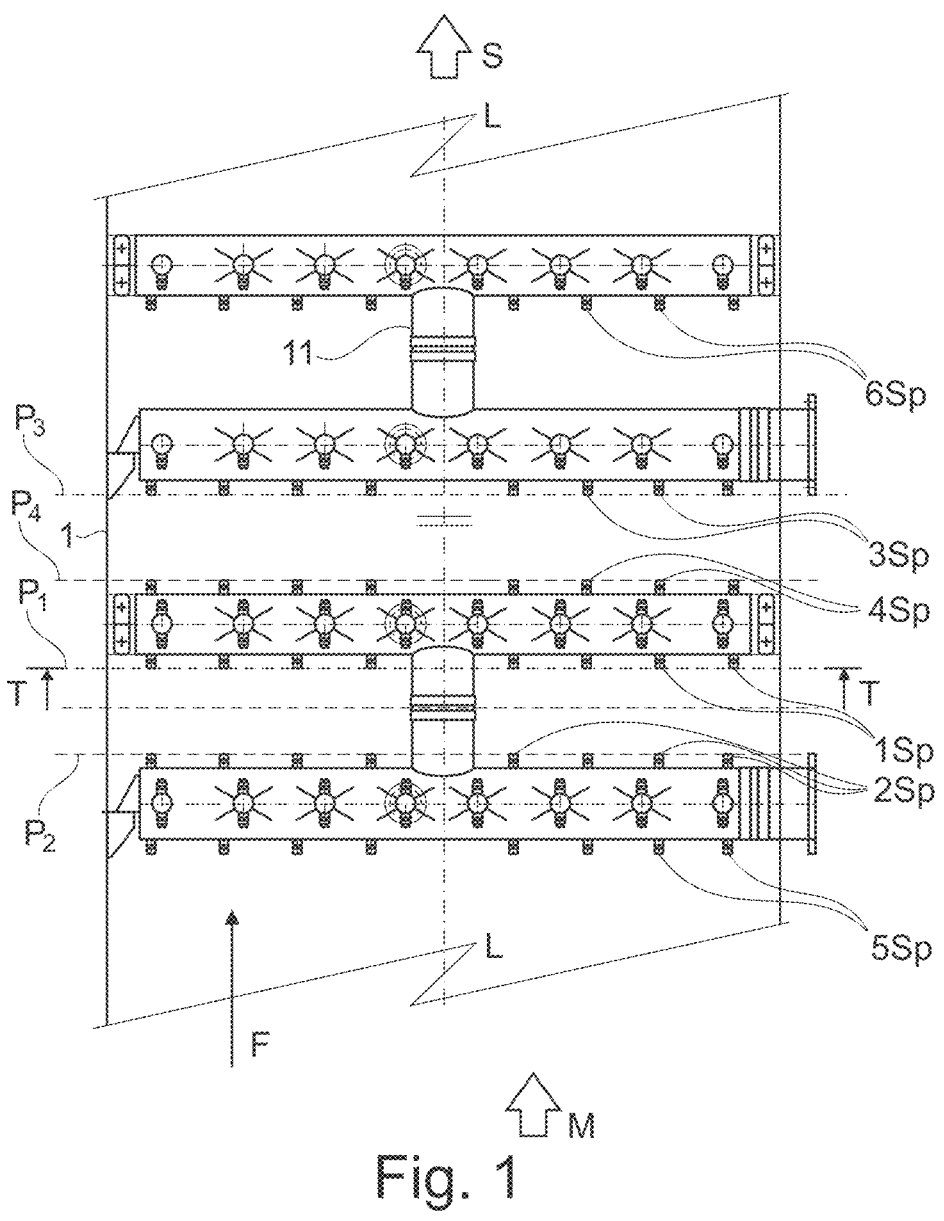
FIG. 1 shows a longitudinal sectional view of a portion of a scrubber according to an embodiment of the present invention.
Figure 2:
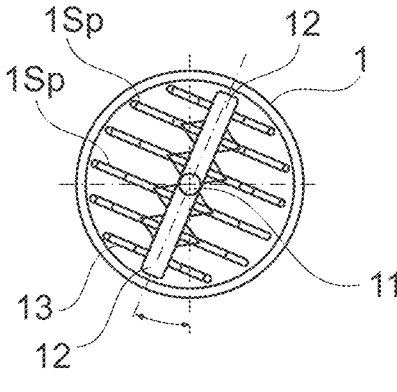
FIG. 2 shows a cross-section view T-T of a scrubber according to a second embodiment of the present invention.

With reference to FIGS. 1 and 2, the scrubber therein depicted comprises a main hollow tubular body 1, an inlet M and an outlet S for introducing and discharging fumes or exhaust gases, respectively, into and from, respectively, main hollow tubular body 1, said inlet M and said outlet S not being shown in detail because they are not essential for the purposes of the present invention. The scrubber further comprises inlet means for introducing at least partially atomized pressurized water into said main hollow body 1, wherein said inlet means comprise a plurality of nozzles 1sp, 2sp, . . . , nsp arranged in said main hollow body 1 and each adapted to dispense said at least partially atomized water, and wherein said inlet means comprise a main hollow tubular manifold cable 11 which extends parallel to the longitudinal axis L-L of said main hollow body 1, and from which a plurality of main transversal branches 13, each in fluid communication with manifold 11, perpendicularly extend from said manifold 11. Moreover, a plurality of secondary branches 13 extend from each of the main branches 12 perpendicularly to manifold 11, the nozzles 1sp, 2sp, . . . , nsp being partly carried by the secondary branches 13 and partly by the main branches 12. Obviously, and according to methods which are substantially known, and therefore are not described in detail for reasons of brevity, manifold 11 is in fluid communication with means which are external to the hollow body 1 and adapted to introduce a fluid, pressurized water in particular, into manifold 11; said means for introducing pressurized water into manifold 11 may, for example comprise a centrifuge pump, wherein the water introduced pressurized into manifold 11 is dispensed in atomized manner by the nozzles 1sp, 2sp, . . . , nsp.

As depicted, the plurality of nozzles comprises a first sub-plurality 1sp of nozzles each adapted to dispense said at least partially atomized pressurized water in counter-flow with respect to the flow (indicated by arrow F in FIG. 1) of said fumes in said main hollow body 1 from said inlet M towards said outlet S, and a second sub-plurality 2sp of nozzles each adapted to dispense said at least partially atomized pressurized water in counter-flow with respect to the flow of said at least partially atomized pressurized water dispensed by said first sub-plurality 1sp of nozzles. Thereby, the atomized water dispensed by the nozzles 1sp collides with the one dispensed by the nozzles 2sp, wherein said collision results in a further splitting of the water droplets, and therefore in the generation of a thick fog in body 1 adapted to hit said fumes or exhaust gases in transit through the hollow body 1. As anticipated, the further splitting of the water droplets allows the residence times of the fumes or gases in the scrubber to be reduced and therefore, the performance of the scrubber in terms of cleaned fumes or gases in the unit of time to be increased, as well as the spray pressure to the nozzles to be reduced, and therefore the consumption of power to be reduced, for example of the aforesaid centrifuge pump.

Figure 3:
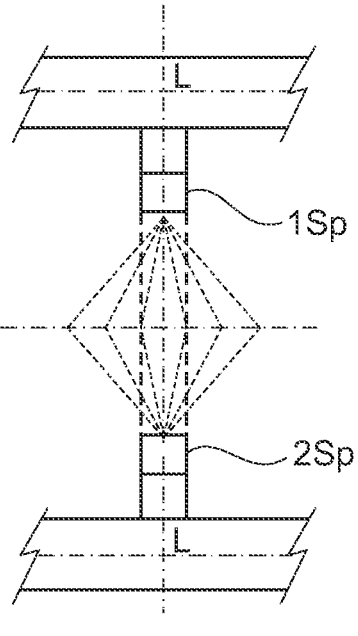
FIG. 3 shows a side view of the mutual arrangement of two nozzles in the scrubber according to an embodiment of the present invention.
Figure 4:
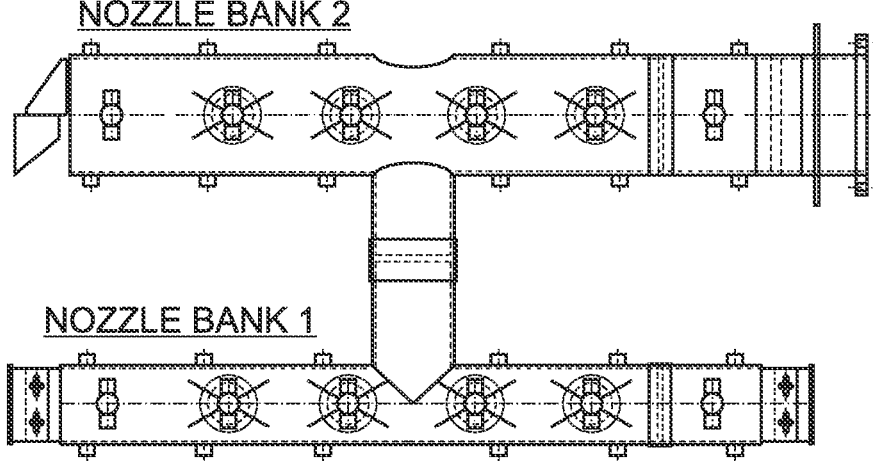
FIG. 4 shows a side view of further details of a scrubber according to an embodiment of the present invention.

Again as depicted (see FIG. 3 in particular), the projection of at least one of said nozzles 1sp of said first sub-plurality onto a plane perpendicular to the longitudinal axis of said main hollow tubular body 1 at least partially overlaps the projection onto the same plane of at least one nozzle of said second sub-plurality 2sp of nozzles (see the dotted line in FIG. 3).

Moreover, according to needs and/or circumstances, said first sub-plurality 1sp and second sub-plurality 2sp of nozzles may comprise the same number or a different number of nozzles, wherein, again according to needs and/or circumstances, if the first sub-plurality 1sp of nozzles comprises an equal or greater number than the number of nozzles 2sp of said second plurality, the projection of each of said nozzles of said first sub-plurality 1sp onto a plane perpendicular to the longitudinal axis L-L of said main hollow tubular body 1 may at least partially overlap the projection onto the same plane of at least one corresponding nozzle of said second sub-plurality 2sp of nozzles.

According to the present invention, the number of nozzles and respective sub-pluralities may vary from at least two to n, wherein according to the embodiment shown in the drawings, the scrubber comprises a third sub-plurality 3sp of nozzles each adapted to dispense said at least partially atomized pressurized water in counter-flow with respect to flow F of said fumes in said main hollow body from said inlet M towards said outlet S, and a fourth sub-plurality 4sp of nozzles each adapted to dispense said at least partially atomized pressurized water in counter-flow with respect to the flow of said at least partially atomized pressurized water dispensed by said third sub-plurality 3sp of nozzles.

As in the case of the sub-pluralities 1sp and 2sp of nozzles, the projection of at least one of said nozzles of said third sub-plurality 3sp onto a plane perpendicular to the longitudinal axis L-L of said main hollow tubular body 1 at least partially overlaps the projection onto the same plane of at least one nozzle of said fourth sub-plurality 4sp of nozzles (see FIG. 3).

Moreover, as in the case of the sub-pluralities 1sp and 2sp of nozzles, also said third sub-plurality 3sp and fourth sub-plurality 4*sp* of nozzles may comprise both the same number of nozzles and a different number of nozzles, wherein if the number of nozzles 3so is equal to or greater than the number of nozzles 4*sp*, the projection of also each of said nozzles of said third sub-plurality 3*sp* onto a plane perpendicular to the longitudinal axis L-L of said main hollow tubular body 1 may at least partially overlap the projection onto the same plane of at least one nozzle of said fourth sub-plurality 2*sp* of nozzles.

Again as depicted, the nozzles of said first sub-plurality 1sp are arranged downstream of the nozzles of said second sub-plurality 2*sp* with respect to flow F of said fumes or gases in transit in the hollow body 1 from said inlet M towards said outlet S, wherein each of the nozzles of said first sub-plurality 1sp and second sub-plurality 2*sp* comprises a dispensing orifice, and wherein the dispensing orifices of the nozzles of said first sub-plurality 1*sp* lie on a first plane P1 perpendicular to the longitudinal axis L-L of said main hollow body 1, and wherein the dispensing orifices of the nozzles of said second sub-plurality 2*sp* lie on a second plane P2 parallel to said first plane. Moreover, said first plane P1 and second plane P2 are arranged adjacent to each other at a first predefined distance D between 400 mm and 1000 mm, preferably equal to about 800 mm.

According to the embodiment of the scrubber of the present invention depicted in the drawings, also the nozzles of the third sub-plurality 3*sp* are arranged downstream of the nozzles of said fourth sub-plurality (4*sp*) with respect to the flow of said fumes from said inlet towards said outlet, wherein also each of the nozzles of said third sub-plurality 3*sp* and fourth sub-plurality 4*sp* comprises a dispensing orifice; the dispensing orifices of the nozzles of said third sub-plurality 3*sp* lie on a third plane P3 perpendicular to the longitudinal axis L-L of said main hollow body 1, while the dispensing orifices of the nozzles of said fourth sub-plurality 4*sp* lie on a fourth plane P4 parallel to said third plane P3 adjacent to said fourth plane P4, the mutual distance between the planes P3 and P4 being able to be, according to the present invention, both equal to and different from distance D between said first plane P1 and second plane P2, also the distance between the planes P3 and P4 being able to be between 400 mm and 1000 mm, preferably equal to 500 mm.

The embodiment depicted in the drawings of the scrubber according to the present invention comprises a fifth sub-plurality 5*sp* (optional) of nozzles each adapted to dispense said at least partially atomized pressurized water in counter-flow with respect to flow F of said fumes in said main hollow body 1 from said inlet M towards said outlet S, the nozzles of said fifth sub-plurality 5*sp* being arranged upstream of the nozzles of said second sub-plurality 2*sp* with respect to flow F of said fumes from said inlet M towards said outlet S.

According to the present invention, the scrubber may further comprise a sixth sub-plurality 6*sp* (optional) of nozzles each adapted to dispense said at least partially atomized pressurized water in counter-flow with respect to the flow of said at least partially atomized pressurized water dispensed by said third sub-plurality 3*sp* of nozzles, the nozzles of said sixth sub-plurality 6*sp* being arranged downstream of the nozzles of said third sub-plurality 3*sp* with respect to the flow of said fumes from said inlet towards said outlet.

Again according to the present invention, a seventh sub-plurality (optional, not shown) of nozzles may be provided, each adapted to dispense said at least partially atomized pressurized water in counter-flow with respect to flow F of said fumes in said main hollow body 1 from said inlet M towards said outlet S, the nozzles of said seventh sub-plurality being possibly arranged downstream of the nozzles of said sixth sub-plurality 6*sp* with respect to flow F of said fumes or gases in transit from said inlet M towards said outlet S.

Thus, it has been demonstrated by the above description of the embodiments of the present invention which are depicted in the drawings, that the present invention allows the objects posed to be achieved, thus overcoming the drawbacks encountered in the prior art.

In particular, as shown, the present invention provides a scrubber for cleaning gases or exhaust fumes, in particular for effectively abating the sulfur oxides $SO_x$ in the gases or exhaust fumes generated by internal combustion engines, in particular marine engines for ships or both commercial and pleasure boats.

Indeed as shown, by virtue of the innovative mutual arrangement, in particular the innovative mutual orientation of the nozzles for dispensing the atomized water, the scrubber according to the present invention allows both the residence time of the fumes or gases in the scrubber and the spray pressure (to the nozzles) of said cleaning water to be reduced, the scrubber according to the present invention also being producible at contained costs, according to simple and easily executed methods, and being implementable in combination with chimneys or stacks for discharging combustion gases of various types and sizes without requiring substantial modifications of structural type of said discharge chimneys or stacks.

It is also worth noting that in addition to cleaning the fumes and abating the sulfur oxides, the scrubber according to the present invention also allows capturing ash and particulate, as well as abating CO and hydrocarbons.

Although the present invention was clarified above by means of the detailed description of the embodiments as depicted in the drawings, the present invention is not limited to the embodiments described above and depicted in the drawings, rather comprises all those variants of the embodiments described and depicted which are obvious and immediate to a person skilled in the art.

For example and as mentioned, according to needs and/or circumstances, the present invention allows both the overall number of nozzles and/or the number of nozzles of each sub-plurality, as well as the number of sub-pluralities of nozzles and the type thereof, to be modified, the scrubber according to the present invention in particular allowing the use of nozzles of the known type so long as they are adapted to dispensing at least partially atomized pressurized water or liquids.

The scope of protection of the present invention is thus defined by the claims.

The invention claimed is:

1. A scrubber for cleaning exhaust fumes generated by internal combustion engines, in particular for reducing the concentration of the sulfur oxides SOx in exhaust fumes generated by the combustion of sulfur content fuels, said scrubber comprising:

a main hollow tubular body defining a longitudinal axis, and having an inlet and an outlet for introducing and discharging said fumes into and from said main hollow tubular body, respectively, and inlet means for introducing at least partially atomized pressurized water into said main hollow body, wherein said inlet means comprises:

a plurality of nozzles arranged in said main hollow body and each adapted to dispense said at least partially atomized pressurized water, wherein said plurality of nozzles comprises:

a first sub-plurality of nozzles in fluid communication with a first main branch within said main hollow body, each of said first sub-plurality of nozzles having a dispensing orifice lying on a first plane perpendicular to said longitudinal axis and adapted to dispense said at least partially atomized pressurized water in counter-flow with respect to the flow of said fumes in said main hollow body from said inlet towards said outlet, a second sub-plurality of nozzles upstream of said first sub-plurality of nozzles and in fluid communication with a second main branch within said main hollow body, each of said second sub-plurality of nozzles having a dispensing orifice lying on a second plane perpendicular to said longitudinal axis and adapted to dispense said at least partially atomized pressurized water in counter-flow with respect to the flow of said at least partially atomized pressurized water dispensed by said first sub-plurality of nozzles, said dispensing orifices of said first and second sub-pluralities of nozzles being arranged on respective ones of said first and second planes such that at least a portion of said at least partially atomized pressurized water dispensed from respective pairs of said first and second sub-pluralities of nozzles collides, a third sub-plurality of nozzles downstream of said first sub-plurality of nozzles and in fluid communication with a third main branch within said main hollow body, each of said third sub-plurality of nozzles having a dispensing orifice lying on a third plane perpendicular to said longitudinal axis and adapted to dispense said at least partially atomized pressurized water in counter-flow with respect to the flow of said fumes in said main hollow body from said inlet towards said outlet, a fourth sub-plurality of nozzles upstream of said third sub-plurality of nozzles, downstream of said first sub-plurality of nozzles and in fluid communication with said first main branch, each having a dispensing orifice lying on a fourth plane perpendicular to said longitudinal axis and adapted to dispense said at least partially atomized pressurized water in counter-flow with respect to the flow of said at least partially atomized pressurized water dispensed by said third sub-plurality of nozzles, said dispensing orifices of said third and fourth sub-pluralities of nozzles being arranged on respective ones of said third and fourth planes such that at least a portion of said at least partially atomized pressurized water dispensed from respective pairs of said third and fourth sub-pluralities of nozzles collides, and a tubular manifold disposed within said main hollow tubular body along said longitudinal axis and placing at least said first and second main branches into fluid communication with each other;

wherein said first plane is arranged adjacent to said second plane at a first distance from said second plane of 800 mm, and said third plane is arranged adjacent to said fourth plane at a second distance from said fourth plane of 500 mm.

2. The scrubber according to claim 1, wherein a first portion of said tubular manifold is in fluid communication with said first and second main branches, and a second portion of said tubular manifold separate from said first portion is in fluid communication with said third main branch.

3. The scrubber according to claim 1, wherein said first sub-plurality and second sub-plurality of nozzles comprise the same number of nozzles, and each of said nozzles of said first sub-plurality of nozzles is paired with a respective nozzle of said second sub-plurality of nozzles.

4. The scrubber according to claim 3, wherein said third sub-plurality and fourth sub-plurality of nozzles comprise the same number of nozzles, and each of said nozzles of said third sub-plurality of nozzles is paired with a respective nozzle of said fourth sub-plurality of nozzles.

5. The scrubber according to claim 1, wherein said third sub-plurality and fourth sub-plurality of nozzles comprise the same number of nozzles, and each of said nozzles of said third sub-plurality of nozzles is paired with a respective nozzle of said fourth sub-plurality of nozzles.

6. The scrubber according to claim 1, wherein said plurality of nozzles comprises a fifth sub-plurality of nozzles in fluid communication with said second main branch, each having a dispensing orifice adapted to dispense said at least partially atomized pressurized water in counter-flow with respect to the flow of said fumes in said main hollow body from said inlet towards said outlet, and wherein the nozzles of said fifth sub-plurality are arranged upstream of the nozzles of said second sub-plurality with respect to the flow of said fumes from said inlet towards said outlet.

7. The scrubber according to claim 6, wherein said plurality of nozzles comprises a sixth sub-plurality of nozzles in fluid communication with a fourth main branch within said main hollow body and in fluid communication with said tubular manifold, each having a dispensing orifice adapted to dispense said at least partially atomized pressurized water in counter-flow with respect to the flow of said fumes in said main hollow body from said inlet towards said outlet, and wherein the nozzles of said sixth sub-plurality are arranged downstream of the nozzles of said third sub-plurality with respect to the flow of said fumes from said inlet towards said outlet.

8. The scrubber according to claim 1, wherein each of said first, second and third main branches extends perpendicularly to said longitudinal axis.

* * * * *